United States Patent
Zhou et al.

(12) 
(10) Patent No.: US 6,500,968 B2
(45) Date of Patent: Dec. 31, 2002

(54) PROCESS FOR SELECTIVE OXIDATION OF ORGANIC FEEDSTOCKS WITH HYDROGEN PEROXIDE

(75) Inventors: Bing Zhou, Cranbury, NJ (US); Michael A. Rueter, Plymouth Meeting, PA (US)

(73) Assignee: Hydrocarbon Technologies, Inc., Lawrenceville, NJ (US)

( * ) Notice: Subject to any disclaimer, the term of this patent is extended or adjusted under 35 U.S.C. 154(b) by 27 days.

(21) Appl. No.: 09/733,154

(22) Filed: Dec. 8, 2000

(65) Prior Publication Data

US 2001/0016187 A1 Aug. 23, 2001

Related U.S. Application Data

(63) Continuation-in-part of application No. 09/140,265, filed on Aug. 26, 1998, now Pat. No. 6,168,775.

(51) Int. Cl.⁷ ..................... C07D 301/12; C07D 301/06
(52) U.S. Cl. ................. 549/531; 549/518; 549/523
(58) Field of Search .............................. 549/531, 518, 549/523

(56) References Cited

U.S. PATENT DOCUMENTS

| | | | |
|---|---|---|---|
| 4,701,428 A | 10/1987 | Bellussi et al. ............... | 502/8 |
| 4,824,976 A | 4/1989 | Clerici et al. ............... | 549/531 |
| 4,937,216 A | 6/1990 | Clerici et al. ............... | 502/62 |
| 5,166,372 A | 11/1992 | Crocco et al. ............... | 549/531 |
| 5,214,168 A | 5/1993 | Zajacek et al. ............... | 549/531 |
| 5,912,367 A | 6/1999 | Chang ............... | 549/529 |

FOREIGN PATENT DOCUMENTS

EP 0978316 2/2000

*Primary Examiner*—Ba K. Trinh
(74) *Attorney, Agent, or Firm*—Fred A. Wilson

(57) ABSTRACT

A process for producing oxidized organic chemical products such as propylene oxide from various organic chemical feedstocks utilizing as oxidant directly produced hydrogen peroxide ($H_2O_2$) intermediate oxidizing agent. The hydrogen peroxide intermediate is directly produced from hydrogen and oxygen feeds plus a suitable solvent in a first catalytic reaction step utilizing an active supported phase-controlled noble metal catalyst at reaction conditions of 0–100° C. temperature and 300–3,000 psig pressure. An organic chemical feedstock such as propylene together with the hydrogen peroxide intermediate and solvent solution are fed into a second catalytic reactor maintained at 0–150° C. temperature and 15–1,500 psig pressure and oxidized to produce a desired crude oxidized organic product such as propylene oxide, which is purified by distillation steps and recovered from the solvent solution.

11 Claims, 2 Drawing Sheets

PROCESS FOR SELECTIVE OXIDATION OF ORGANIC FEEDSTOCKS WITH HYDROGEN PEROXIDE

This is a continuation-in-part of co-pending patent application Ser. No. 09/140,265, filed Aug. 26, 1998, now U.S. Pat. No. 6,168,775.

BACKGROUND OF INVENTION

This invention pertains to a process for producing oxidized organic chemical products by selective catalytic oxidation of organic chemical feedstocks with hydrogen peroxide intermediate. It pertains particularly to such a selective oxidation process in which the hydrogen peroxide intermediate is provided by direct reaction of hydrogen and oxygen using a supported phase-controlled noble metal catalyst having high reactivity and selectivity.

Selective oxidation reactions are a major class of chemical transformations which account for the production of a wide variety of important chemical products, including alcohols, carbonyl compounds, epoxides, hydroxylates, acids, glycols and glycol ethers, lactones, oximes, and oxygenated sulfur and nitrogen compounds such as sulfoxides, sulfones, nitrones, azo compounds, and other N-oxides. Performing these chemical transformations efficiently, economically, and safely requires a suitable oxidizing agent which can be purchased or produced to react with the desired organic chemical feedstock, which is then converted to the oxidized organic chemical product.

Several significant problems face conventional catalytic oxidation processes. In some cases, selective oxidation reactions are performed utilizing oxygen as the oxidizing agent. However, producing purified oxygen is expensive, requiring large capital investment and operating costs. Also, processes using purified oxygen combined with organic chemical feedstocks may accidentally achieve gas compositions in the explosive range, thereby posing a serious safety hazard. In other cases, selective oxidation processes utilize air as the oxidizing agent. But a major economic problem associated with such processes utilizing air is handling the accompanying undesired large flow of nitrogen, which substantially increases process costs. Such oxidation processes can also be prone to forming explosive gas mixtures. Oxidative processes using oxygen or air also tend to suffer from product selectivity problems related to overoxidation of the organic chemical feedstock, normally producing undesired carbon oxides ($CO$, $CO_2$).

For such selective oxidation reactions, an attractive alternative to using oxygen or air as the oxidation agent is the use of peroxidic compounds to provide the reactive oxygen needed for oxidative transformations. One common version is the use of organic hydroperoxides as oxidizing agents. These hydroperoxide compounds, typically generated by air- or $O_2$-oxidation of suitable intermediates, are reacted with chemical feedstocks to form oxygenated products and organic by-products. However, these organic by-products represent a significant disadvantage for processes of this type, because a large amount of organic material must be recovered, either for recycle or for sale as a secondary product. In some cases, the amount of this secondary product is greater than the amount of the primary oxygenated product, and is typically a less desirable product. For example, conventional production of propylene oxide also results in production of large amounts of styrene or tert-butyl alcohol co-products, which typically must be marketed in economically unpredictable markets. Furthermore, processes involving organic hydroperoxide intermediates pose significant safety hazards. Generating hydroperoxides requires reactions of air with organic chemicals which may form explosive mixtures, and organic peroxides can themselves be explosive, particularly if they are accidentally concentrated above a certain critical concentration level.

Instead of using organic peroxides, hydrogen peroxide is a known desirable oxidizing agent. The byproduct of oxidation reactions using hydrogen peroxide is typically water, a safe compound that can be easily recovered and reused or disposed. The amount of water on a weight basis is much less than the amount of organic by-product when organic hydroperoxides are used, and thereby represents significant savings in process costs. However, past attempts to develop selective chemical oxidation processes based on hydrogen peroxide have encountered significant difficulties. Conventional hydrogen peroxide production utilizes the anthraquinone process, wherein the anthraquinone is first hydrogenated to hydroanthraquinone and then autoxidized to release hydrogen peroxide and the anthraquinone for recycle. Hydrogen peroxide is generated at low concentrations in the solution, and very large flows of anthraquinone and anthrahydroquinone must be handled in order to produce the desired hydrogen peroxide product. Accordingly, such conventionally produced hydrogen peroxide is generally too expensive for commercial use as an oxidizing agent for selective chemical oxidation processes.

An important alternative is generating hydrogen peroxide directly by the catalytic reaction of hydrogen and oxygen, which avoids the difficulty of accompanying large flows of a working solution and can reduce the cost of hydrogen peroxide. The prior art includes a number of catalytic technologies which directly convert hydrogen and oxygen to hydrogen peroxide, but generally utilize a hydrogen/oxygen feed wherein the hydrogen concentration is greater than about 10 mol %, which is well above the flammability limit of ~5 mol % for such mixtures and creates a serious process hazard. At hydrogen feed concentrations below 5 mol %, the prior art catalysts are not sufficiently active and selective to generate hydrogen peroxide product at a reasonable rate. However, an improved process for direct catalytic production of hydrogen peroxide utilizing an active supported phase-controlled noble metal catalyst is now available as disclosed by our co-pending patent application Ser. No. 09/140,265.

Various oxidation processes for organic chemical feedstocks utilizing hydrogen peroxide are known. For example, U.S. Pat. No. 4,701,428 discloses hydroxylation of aromatic compounds and epoxidation of olefins such as propylene using a titanium silicalite catalyst. Also, U.S. Pat. Nos. 4,824,976; 4,937,216; 5,166,372; 5,214,168; and 5,912,367 all disclose epoxidation of various olefins including propylene using titanium silicalite catalyst. European Patent No. 978 316 A1 to Enichem describes a process for making propylene oxide, including a first step for direct synthesis of hydrogen peroxide using a Pd catalyst, and a second step for epoxidation of propylene to form propylene oxide using titanium silicalite (TS-1) catalyst. However, the best hydrogen peroxide product selectivity reported is only 86%, based on the amount of hydrogen converted. In the process second step, the best selectivity of propylene oxide formation is 97%, based on hydrogen peroxide conversion. Therefore, the best overall yield of propylene oxide, based on hydrogen feed, that can be achieved is 83%. However, higher yields of oxidized organic products are much desired, particularly when considering the relatively high cost of the hydrogen feedstock which is required for the direct catalytic synthesis of hydrogen peroxide.

SUMMARY OF INVENTION

This invention provides a catalytic process which includes two basic chemical transformation reactions or steps for selective oxidation of organic chemical feedstocks with hydrogen peroxide intermediate to produce desired oxidized organic chemical products. In the first reaction step, hydrogen and oxygen are directly catalytically reacted with a suitable solvent such as alcohol/water solutions to form the hydrogen peroxide intermediate by advantageously utilizing a new supported phase-controlled noble metal catalyst which has high reactivity and selectivity. For the catalyst, the noble metal constituent is present as nano-size particles with controlled phase exposition, thereby ensuring that only the most active and selective noble metal sites are available for reaction. In the second reaction step, the hydrogen peroxide intermediate and suitable solvent such as water and/or an alcohol reacts oxidatively with the selected organic chemical feedstock for producing the desired oxidized organic chemical product, with water typically being the main by-product. This second reaction step may be non-catalytic, but will typically utilize a suitable selective oxidation catalyst of either homogeneous or heterogeneous type. The two successive reaction steps are performed in separate catalytic reactors, with intermediate recovery steps being provided as desired for the overall selective oxidative process.

A variety of organic chemical feedstocks can be used in this overall process to produce the desired oxidized organic chemical products. Major classes of organic chemical feedstocks include aromatics, alkanes, ketones and olefins, as well as compounds containing mixed functionality and heteroatoms such as sulfur or nitrogen, with the olefin feedstocks usually being preferred. The major groups of oxidized organic chemical products are alcohols, epoxides, carboxylic acids, hydroxylated aromatics, aldehydes/ketones, glycols, oximes, and N-oxides.

A significant advantage of the present two-step catalytic selection oxidation process utilizing hydrogen peroxide intermediate is that it provides increased yields of the desired oxidized products with respect to hydrogen feed. Because of the high cost of hydrogen, it is critical to minimize the hydrogen demand as much as possible. The present process is able to achieve essentially 100% selectivity of the hydrogen peroxide intermediate based on hydrogen usage. Therefore, the integrated two-step process, consisting of a first step in which hydrogen peroxide intermediate is catalytically synthesized by direct reaction of hydrogen and oxygen (at 100% selectivity), and a second step in which the hydrogen peroxide is catalytically reacted with an organic chemical feedstock such as propylene over titanium silicalite (TS-1) catalyst or the like to make propylene oxide (at >95% selectivity with respect to $H_2O_2$), provides a net overall yield of propylene oxide product with respect to hydrogen of over 95%. This is a significant improvement in hydrogen utilization compared to prior art processes, for which the best reported overall selectivity to propylene oxide product is only about 83%.

DESCRIPTION OF INVENTION

For solving the problems of low product selectivity for the prior art processes for producing oxidized organic chemical products at desired high selectivity, the present process using a new supported phase-controlled noble metal catalyst allows the hydrogen peroxide intermediate to be directly produced economically and safely, and then utilized for the selective oxidative conversion of a variety of organic chemical feedstocks. A distinctive and advantageous feature of this invention is the use of a supported phase-controlled noble metal catalyst such as palladium (Pd) on a carbon support and which directly converts hydrogen and oxygen to the hydrogen peroxide intermediate at high activity and selectivity, so that the hydrogen peroxide intermediate can be economically produced even when the hydrogen feed concentration is below the flammability limit of 5 mol %. The hydrogen peroxide intermediate product is then utilized to oxidize an organic chemical feedstock, which may be selected from several classes of chemical compounds to generate a variety of desired oxidized chemical products. The reaction of hydrogen peroxide with the feedstock may be non-catalytic, but will more typically utilize a suitable catalyst such as titanium silicalite depending upon the specific organic chemical feedstock.

Figure 1:
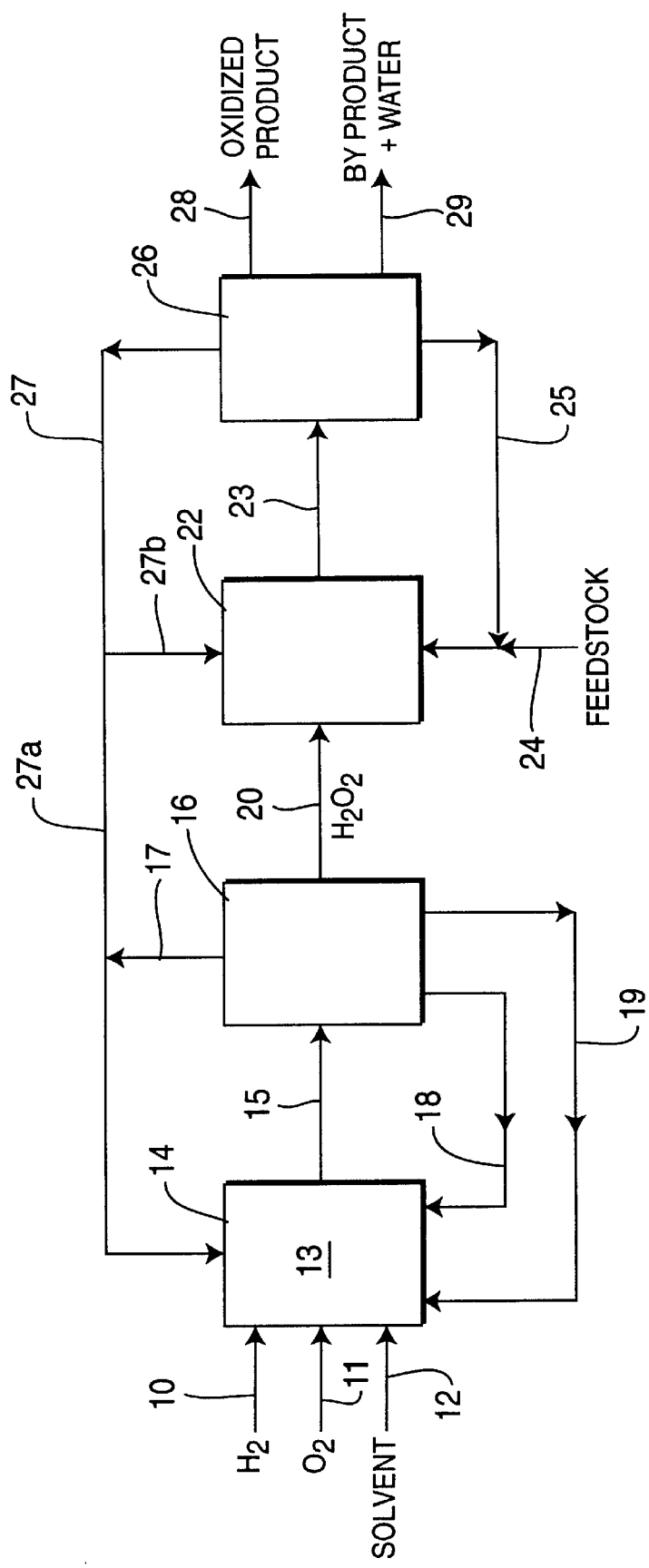
FIG. 1 depicts a general schematic flowsheet for an overall two-stage process for oxidizing organic chemical feedstocks utilizing hydrogen peroxide intermediate directly produced by utilizing an active catalyst.

In the process of this invention, the hydrogen peroxide direct production step and the selective oxidation reaction step for the organic chemical feedstock are performed in two separate reactors, with the general overall process being shown schematically in FIG. 1. In this process, hydrogen provided at 10 and oxygen (as purified oxygen or air) provided at 11 and with a liquid solvent 12 are reacted over the supported phase-controlled noble metal catalyst 13 in reactor 14 to generate a liquid solution of hydrogen peroxide intermediate product at 15. The reactor 14 may contain a fixed, fluidized or slurried bed of the catalyst 13, with a slurried catalyst bed usually being preferred. The liquid medium at 12 may be water, or it may be a suitable organic solvent such as alcohols or mixtures thereof. Suitable organic solvents can include various alcohols, aldehydes, aromatics, esters and keytones, or any other organic compounds that are useful for producing propylene oxide. Solvents are preferably water-soluble alcohols such as methanol, ethanol, isopropanol and mixtures thereof. The hydrogen concentration in reactor 14 is maintained below the flammability limit of about 5 mol %. The liquid-phase concentration of hydrogen peroxide intermediate product at 15 can vary over a useful range of 1–30 wt. %. A lower liquid phase peroxide concentration (e.g. <10 wt %) favors a high hydrogen selectivity of almost 100%, whereas a higher liquid phase peroxide concentration will favor reduced separation costs in downstream processing equipment. The optimum hydrogen peroxide concentration at 15 will depend on a variety of factors, including hydrogen cost, separation requirements, and optimal peroxide concentration for best performance of the downstream second-stage reactor. In general, the preferred $H_2O_2$ concentration at 15 will be 1–20 wt. %, and more preferably will be 2–15 wt. %.

The catalyst 13 for the first step direct catalytic production of the hydrogen peroxide intermediate from hydrogen and oxygen feeds in reactor 14 is a supported phase-controlled palladium (Pd) slurry catalyst that selectively produces essentially only the hydrogen peroxide intermediate, as disclosed in our co-pending patent application Ser. No. 09/140,265. By using appropriate ratios of an ionic linear polymer agent for making the catalyst, the noble metal atoms such as Pd are deposited on the support in a generally linear pattern that corresponds to forming mainly Pd crystal phase or face 110. Such Pd crystal phase exposition allows only limited hydrogen adsorbing on the adjacent metal sites that adsorb oxygen, avoiding the oxygen attached by more than enough hydrogen such as for Pd phases 100 and 111. The supported phase-controlled Pd catalyst has been experimentally proved to directly produce hydrogen peroxide at very high selectively. By using this catalyst in reactor 14 and at reaction conditions of 0–80° C. temperature and 500–3,000 psig pressure, the process first reaction step will produce hydrogen peroxide intermediate at selectivity near 100%.

While water may be used as the reaction medium at 12 for producing the hydrogen peroxide intermediate, it has been unexpectedly found that a significant advantage occurs with use of a water-miscible alcohol for at least part of the reaction solution mixture. Such alcohol usage significantly increases the rate of hydrogen peroxide formation in the first reactor 14, raising the productivity of the hydrogen peroxide producing reactor on a unit-catalyst basis. While alcohols have been used as solvent for direct $H_2O_2$ production in the prior art, no significant advantage for production rates have been reported. The combination of utilizing the phase-controlled noble metal catalyst of this invention with an alcohol or alcohol-water reaction medium provides a synergistic effect, yielding greatly improved performance relative to that disclosed by the prior art processes.

From the first step reactor 14, the effluent stream 15 is a mixture of hydrogen peroxide solution in water and/or alcohol and unreacted gases. As shown by FIG. 1, a separation step 16 may be provided between the first and second stage reactors. Generally, unreacted gases will be removed at 16 and after suitable scrubbing may be vented from the process, or in the case of purified oxygen feed at 12 the unreacted gases may be recycled at 18 back to the first reactor 14 to utilize the additional oxygen. Other than unreacted gas removal and possible catalyst recovery at 19 for reuse in reactor 14, this selective oxidation process configuration requires no further separations at 16 after the catalytic reaction stage 14. Although not preferred, in some cases it may be desirable to remove a portion of the solvent or water from the first reactor effluent at 17 to generate a suitable hydrogen peroxide feed concentration for the second stage reactor. From separation step 16, the hydrogen peroxide intermediate together with the remaining alcohol and/or water solution at 20 is passed on to a second catalytic reaction step at 22 for oxidation reaction with a selected organic chemical feedstock such as propylene provided at 24. The hydrogen peroxide concentration in stream 20 will preferably be the same as in the stream 15 from catalytic reactor 14.

In the second stage reactor 22, the hydrogen peroxide intermediate is reacted with the organic chemical feedstock 24 such as propylene to generate a desired crude organic product such as propylene oxide. This second reaction may be non-catalytic, but is usually based on a heterogeneous catalyst, possibly a zeolitic catalyst such as titanium silicalite or related catalysts, or based on a homogeneous catalyst. Depending upon the chemical feedstock provided at 24, the choice of selective oxidation catalyst will vary and suitable oxidation catalysts are known and described in the prior art. In cases where the second catalytic reactor contains a solid heterogeneous catalyst, various reactor types may be utilized, such as fixed bed, fluidized bed, slurry bed and other types known in the art. The optimal reactor choice will depend on several factors, including mass transfer, catalyst recovery cost, temperature control, and catalyst life and cost. The solvent used for this second reaction step 22 may be the same or different from that used in the first reactor 14 for making the hydrogen peroxide intermediate. However, use of the same solvent or reacting medium in both reactors 14 and 22 is preferred, thereby avoiding undesired separation steps at 16 between the two reactors. Suitable broad reaction conditions for reactor 22 are 0–150° C. temperature and 15–1,500 psig pressure, with 10–100° C. temperature and 50–1,000 psig pressure usually being preferred.

After the selective oxidation reaction second step at reactor 22, the crude reaction product at 23 is subjected to one or more separations and/or distillations at 26 as needed to generate a purified oxidized chemical product, recover any unreacted feedstock or hydrogen peroxide at 25 and solvent at 27 for recycle, and remove water and other undesired by-products. If the same solvent solution is utilized for both reactor stages 14 and 22, with little or no separation in between the reactors as is preferred, then the solvent recovered at 26 will be recycled at 27 and 27a back to the first reactor 14. If the solvents are different, or if no solvent is used in the first stage reactor 14, then the solvent recovered at 26 from the second stage reactor 22 will be recycled at 27b back to the second stage reactor 22. The purified oxidized product is removed at 28 and by-products including water are removed at 29.

For the selective oxidation process of this invention, a large variety of selected organic chemical feedstocks may be provided at 24 to the second stage reactor 22, and reacted with the hydrogen peroxide intermediate at 20 which is produced directly from the hydrogen and oxygen feeds using the active supported phase-controlled noble metal catalyst 13, and then the hydrogen peroxide intermediate and catalysts known in the art used to selectively oxidize the various organic chemical feedstocks provided at 24 to produce important desired oxidized organic chemical products.

A more detailed description of the first-step catalytic reaction and catalyst for directly producing the hydrogen peroxide intermediate product is provided in our co-pending patent application Ser. No. 09/140,265, which is incorporated herein by reference to the extent necessary to disclose the supported phase-controlled noble metal catalyst and process steps for producing hydrogen peroxide. A more detailed description of the second reaction step for efficiently utilizing hydrogen peroxide intermediate for oxidizing various organic chemical feedstocks such as propylene to produce oxidized chemical products such as propylene oxide is provided by FIG. 2.

Some important specific and preferred organic chemical feedstocks and their corresponding oxidized products which may be processed by the two-step selective catalytic oxidation process of this invention utilizing hydrogen peroxide intermediate are listed as follows:

Propylene → Propylene Oxide
Allyl Chloride → Epichlorohydrin
Cyclohexene → Cyclohexene Oxide
Benzene → Phenol
Phenol → Hydroquinone and Pyrocatechol The olefins feedstocks are more preferred, with propylene being the most preferred feedstock for producing propylene oxide product.

Figure 2:
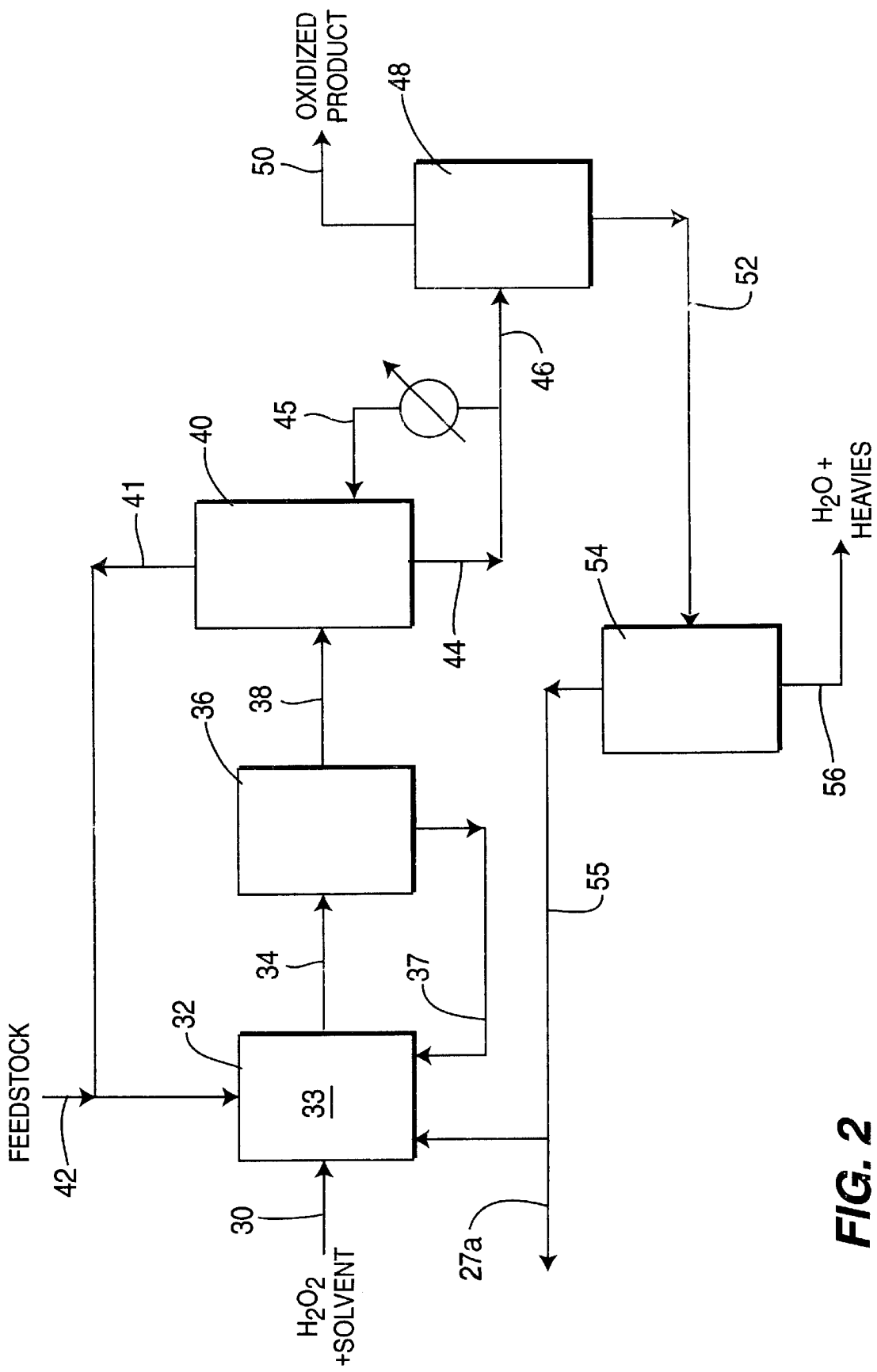
FIG. 2 shows a more detailed flowsheet for a specific embodiment of the invention utilizing the hydrogen peroxide intermediate for oxidizing various organic chemical feedstocks such as propylene to produce oxidized organic products such as propylene oxide product.

As shown in FIG. 2, the hydrogen peroxide ($H_2O_2$) intermediate and solvent provided at 30 are introduced together with a selected organic chemical feedstock 42 such as propylene into catalytic reactor 32, which may be a fixed bed, fluidized bed or slurry type reactor containing a known oxidation catalyst such as titanium silicalite (TS-1). For a fixed bed reactor, the catalyst particle size will be 0.125–0.500 inch, and for a fluidized or slurry reactor the catalyst size will be 50–1,000 microns. The reactor 32 is maintained at broad reaction conditions of 0–150° C. temperature and 15–1,500 psig pressure, and preferably at 10–100° C. temperature and 50–1,000 psig pressure. If the reactor 32 is a fluidized or slurry bed type, the reactor effluent stream 34 will contain unreacted feed, solvent and some fine catalyst, and the catalyst is recovered at step 36 such as by centrifugation or filtration and recycled at 37 back to the reactor 32 for reuse. For fixed bed reactors, no catalyst recovery and recycle is needed. Following any catalyst recovery, the remaining stream 38 is passed to propylene feedstock recovery step or tower 40, from which overhead stream 41 containing any unreacted propylene feed is recycled back to the reactor 32, together with the fresh propylene feedstock supplied at 42. The propylene recovery step at 40 may be a single distillation tower as shown by FIG. 2, or it may include sequential distillation towers operated at progressively lower pressures as desired.

From the feedstock recovery tower 40, a distillation bottoms stream 44 is withdrawn and a heated portion 45 provides reflux to the tower 40. The remainder stream 46 is passed to product distillation tower 48, from which propylene oxide product is removed overhead at 50 for further purification as desired. Solvent and any heavy fractions are withdrawn from tower 48 as stream 52 and passed to solvent recovery tower 54. The solvent which may include some water is removed overhead at 55 and recycled back to the reactor 32, while heavy fractions and the net water produced in reactor 32 are withdrawn at 56 for other use or disposal.

The above described product separation/distillation sequence of FIG. 2 is generally preferred, in that lighter products are removed first at higher pressure, followed by removal of heavier products at successively lower pressure. This scheme avoids excessively high temperatures in the bottom of any of the distillation towers, thereby preventing excessive decomposition of the product. However, other useful process schemes or sequences for oxidized product purification and recovery are also possible as will be understood by those skilled in this art, and it is understood that this process sequence per FIG. 2 is not meant to limit the scope of this invention.

This invention will be described further with the aid of the following examples, which should not be construed as limiting the scope of the invention.

EXAMPLE 1

0.25 grams of 0.7 wt. % Pd/carbon black catalyst was suspended in 75 ml of 1 wt. % sulfuric acid aqueous solution with 5 ppm NaBr. Reaction was conducted in a 1-liter glass-lined autoclave reactor in a semi-batch mode with continuous gas phase, and slurry including catalyst, reaction solution and product were maintained at 45° C. temperature and 1,000 psig pressure in the reactor during the reaction period. 3% $H_2$ in air was continuously fed into the reactor at 1 liter/minute. After 6 hours at the reaction conditions, the liquid phase was separated from the catalyst by filtration. The resulting product was analyzed by titration with potassium permanganate and 2.8 wt. % $H_2O_2$ was obtained.

EXAMPLE 2

Conditions same as for Example 1, except with 0.5 grams Pd/carbon black catalyst and 50 ml aqueous solution at 1,400 psig pressure. After 3 hours reaction time, 4.2 wt. % $H_2O_2$ was obtained.

EXAMPLE 3

Conditions same as for Example 1, except at 1,400 psig pressure and water solvent was replaced with methanol. After 2 hours reaction, 4.1 wt. % $H_2O_2$ was obtained.

EXAMPLE 4

Conditions same as for Example 1, except at 700 psig pressure and water solvent was replaced with methanol. After 2 hours reaction, 2.4 wt. % $H_2O_2$ was obtained.

EXAMPLE 5

Conditions same as for Example 1, except at 700 psig pressure, and water solvent was replaced with methanol. After 6 hours reaction, 7.0 wt. % $H_2O_2$ was obtained.

The reaction conditions and results for these Examples 1–5 are summarized below in Table 1.

| Example | Catalyst (g) | Solvent | Liquid Volume (ml) | Reaction Time (h) | P (psig) | T (° C.) | $H_2$ Feed Rate (1/min) | $H_2O_2$ Conc. (wt. %) | $H_2$ Conv. (%) | $H_2O_2$ Select. (wt. %) | Yield (g $H_2O_2$/ g Pd/h) |
|---|---|---|---|---|---|---|---|---|---|---|---|
| 1 | 0.25 | $H_2O$ | 75 | 6 | 1,000 | 45 | 1 | 2.8 | 15.1 | 97 | 205 |
| 2 | 0.5 | $H_2O$ | 50 | 3 | 1,400 | 45 | 1 | 4.2 | 25.4 | 100 | 209 |
| 3 | 0.25 | $CH_3OH$ | 75 | 2 | 1,400 | 45 | 1 | 4.1 | 62.4 | 100 | 916 |
| 4 | 0.25 | $CH_3OH$ | 75 | 2 | 700 | 45 | 1 | 2.4 | 41.5 | 97 | 526 |
| 5 | 0.25 | $CH_3OH$ | 75 | 6 | 700 | 45 | 1 | 7.0 | 41.9 | 100 | 535 |

Based on these results, it is seen that using water as solvent for the direct hydrogen and oxygen catalytic reaction provided $H_2O_2$ yields of only 200–210 gram $H_2O_2$ relative to Pd in the catalyst. But by using methanol as solvent for the direct catalytic reaction provides significantly higher yields of hydrogen peroxide ($H_2O_2$) product relative to the weight of palladium (Pd) in the catalyst.

Although this invention has been described broadly and also identifies specific preferred embodiments, it will be understood that modifications and variations may be made within the scope of the invention as defined by the following claims.

We claim:

1. A process for selective oxidation of organic chemical feedstocks utilizing directly produced hydrogen peroxide intermediate oxidant, the process comprising:

(a) feeding hydrogen and oxygen-containing gas together with a solvent solution into a first catalytic reactor containing a supported phase-controlled noble metal catalyst, maintaining said first reactor at conditions of 0–100° C. temperature and 300–3,000 psig pressure and forming hydrogen peroxide intermediate in the solvent solution and unreacted gases;

(b) recovering said phase-controlled noble metal catalyst from said hydrogen peroxide intermediate and recycling the catalyst back to said first reactor;

(c) separating any unreacted hydrogen and oxygen gases from the hydrogen peroxide intermediate and recycling the gases back to said first reactor;

(d) feeding an organic chemical feedstock together with 1–30 wt. % said hydrogen peroxide intermediate and solvent into a second catalytic reactor, maintaining said second reactor at conditions of 0–150° C. temperature and 15–1,500 psi pressure, and oxidizing said chemical feedstock to provide a crude oxidized product; and (e) separating said second catalyst and unused solvent solution from said crude oxidized organic product, recycling said second catalyst and solvent back to said second catalytic reactor, and recovering a purified oxidized organic chemical product from the process.

2. The organic chemical selective oxidation process of claim 1, wherein said solvent to said first catalytic reactor is a methanol and water solution.

3. The organic chemical selective oxidation process of claim 1, wherein said first catalyst comprises a particulate support material having total surface area of 50–500 m²/gm; and 0.01–10 wt. % noble metal controllably deposited on said particulate support material, said noble metal having a wide distribution of minute crystals each having size of 0.5–100 nanometers (nm) on said particulate support and has atoms of the noble metal exposed in an orderly linear alignment pattern on the metal crystals, so that at least most of the noble metal crystals have a phase exposition of 110 and/or 220, wherein said noble metal is palladium in combination with platinum, gold, iridium, osmium, rhodium, or ruthenium, and combinations thereof.

4. The organic chemical selective oxidation process of claim 1, wherein said first catalytic reactor conditions are 10–80° C. temperature and 500–2,500 psig pressure.

5. The organic chemical selective oxidation process of claim 1, wherein after said first catalytic reactor said solvent solution contains 2–20 wt. % hydrogen peroxide intermediate.

6. The organic chemical selective oxidation process of claim 1, wherein a portion of said solvent solution is recycled back to said first reactor.

7. The organic chemical selective oxidation process of claim 1, wherein said second catalyst is titanium silicalite.

8. The organic chemical selective oxidation process of claim 1, wherein said second catalytic reactor conditions are 10–100° C. temperature and 50–1,000 psig pressure.

9. The organic chemical selective oxidation process of claim 1, wherein said crude oxidized organic product includes byproducts which are removed by separation/distillation steps to provide a purified oxidized organic product.

10. The organic chemical selective oxidation process of claim 1, wherein said organic chemical feedstock is propylene, and said oxidized organic product is propylene oxide.

11. A two-step process for selective oxidation of organic chemical feedstocks utilizing as oxidant directly produced hydrogen peroxide intermediate, the process comprising:

(a) feeding hydrogen and oxygen-containing gas together with an alcohol/water solvent solution into a first catalytic reactor containing a supported phase-controlled noble metal catalyst as defined by claim 3, maintaining said first reactor at conditions of 10–80° C. temperature and 500–2,500 psig pressure and forming 2–20 wt. % hydrogen peroxide intermediate in the solvent solution and unreacted gases;

(b) recovering said supported phase-controlled noble metal catalyst from said hydrogen peroxide intermediate and recycling the catalyst back to said first reactor;

(c) separating any unreacted hydrogen and oxygen gases from the hydrogen peroxide intermediate and recycling the gases back to said first reactor;

(d) feeding propylene feedstock together with said hydrogen peroxide intermediate and solvent solution into a second catalytic reactor, maintaining said second reactor at conditions of 10–100° C. temperature and 50–1,000 psig pressure, and oxidizing said propylene feedstock to provide a crude propylene oxide product; and (e) separating said second catalyst and unused solvent solution from said crude propylene oxide product, recycling said catalyst and solvent back to said second catalytic reactor, separating said unreacted feedstock and recycling it back to said second reactor, purifying said crude propylene oxide by successive separation/distillation steps, and recovering the propylene oxide product from the process.

* * * * *